United States Patent [19]

Mun

[11] Patent Number: 5,191,609

[45] Date of Patent: Mar. 2, 1993

[54] SCRAMBLING AND UNSCRAMBLING CIRCUIT

[75] Inventor: Heun-Heui Mun, Suwon, Rep. of Korea

[73] Assignee: Samsung Electronics Co., Ltd., Suwon, Rep. of Korea

[21] Appl. No.: 674,970

[22] Filed: Mar. 26, 1991

[30] Foreign Application Priority Data

Apr. 14, 1990 [KR] Rep. of Korea ............... 1990-5208

[51] Int. Cl.⁵ .................................................. H04N 7/167
[52] U.S. Cl. .......................................... 380/14; 380/17
[58] Field of Search ................................. 380/14, 17

[56] References Cited
U.S. PATENT DOCUMENTS 4,424,532 1/1984 Den Toonder et al. ............ 380/17
4,731,837 3/1988 Gautier ................................ 380/14
4,910,772 3/1990 Matias et al. ....................... 380/14

Primary Examiner—Stephen C. Buczinski
Attorney, Agent, or Firm—Robert E. Bushnell

[57] ABSTRACT

There is disclosed a circuit for scrambling an input signal, which has a pseudo-random address generator to detect a synchronizing signal from the input signal and to generate therefrom pseudo-random address and sequential address. The inventive circuit has memories, the input signal being written thereon according to the pseudo-random address from the pseudo-random address generator in a write mode, and the input signal being read out therefrom according to the sequential address from the pseudo-random address generator in a read mode.

6 Claims, 5 Drawing Sheets

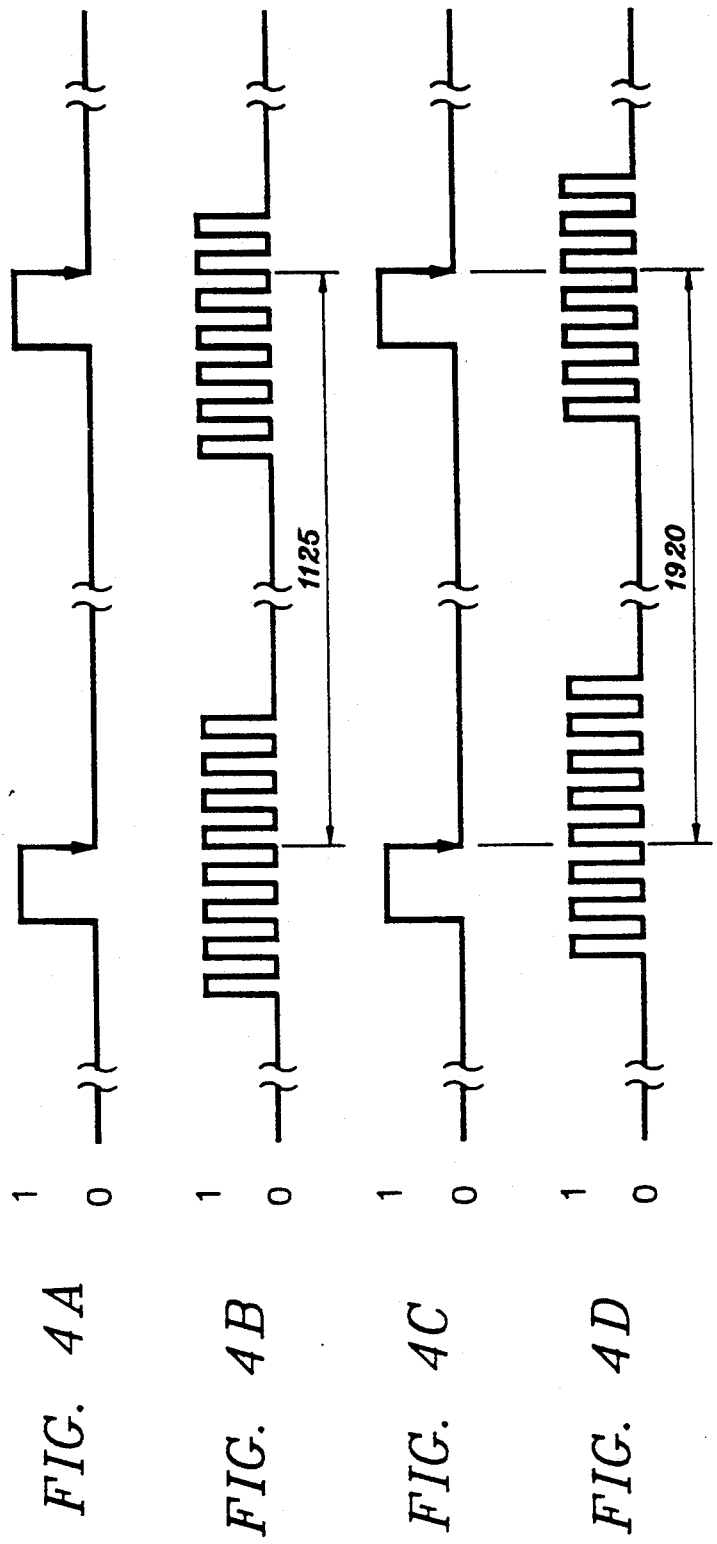

SCRAMBLING AND UNSCRAMBLING CIRCUIT

BACKGROUND OF THE INVENTION

The present invention relates to a signal encoding and decoding circuit for a television (hereinafter, referred to as TV) receiver and transmitter, and more particularly to a circuit which changes the input signal by changing the state of assigning address to a memory.

In a generally adopted TV a transmission and reception method, image, voice and other various synchronizing signals from a video camera are modulated and transmitted via transmission antenna, and the original image and voice signals are restored in a receiver set by demodulating the transmitted signals. Recently, only the restricted viewers with cables are allowed to receive the broadcast by using a cable method instead of a wireless method, and a cable TV transmission and reception method is introduced for improving an image quality. Recently, however, since a transmitting part transmits a scrambled transmission signal in order to charge service fee for transmitted data, a transmission and reception method requiring for a device decoding the transmitted signal is introduced into a receiving part, in the wireless and cable TV transmission and reception methods. In the next generation for the TV transmission and reception method, the stated above method is to be used for the purpose of reducing noise. The above method for scrambling (encoding) the signal was used for military purposes in the early stage, but recently it is frequently being used in TV or satellite communications as stated forgoing.

FIG. 1 is a conventional circuit for scrambling the signal, and it is illustrated hereinafter.

First, a scrambler 50 for scrambling a signal in a receiving part is described. A key-data generator 102 controlled by a controller 101 generates regular serial data composed of a given number of bits. A first pseudo-random address generator 103 supplied with the data output from the key-data generator 102 addresses a memory 104 pseudo-randomly when input signal is stored in the memory. When the stored data is read out from the memory 104, the input signal is randomly mixed with the stored data, by sequentially addressing the memory in response to mode signal output from a controller 101 and by reading out the data randomly stored in the memory 104. In this case, reading out and writing operation is determined by read and write signal output from the controller 101. Since the regular data output from the key-data generator 102 is inserted between the data output from output terminal D0 of the memory 104 while the data output from the memory 104 passing through a key-data inserting unit 105, the input signal 1 is completely scrambled.

Next, an unscrambler 60 for unscrambling the scrambled signal output from the above scrambler 50 is described. The scrambled signal output from the key-data inserting unit 105 is transmitted through a cable or a wireless transmission and applied to a card reader and key-data separator 107. When a user enters selected data onto a magnetic card 108 in order to restore the scrambled signal to the original signal, the card reader and key-data separator 107 compares the above selected data with the key-data, if equal to, applies data to a memory 110 after erasing the key-data. At the same time, the card reader and key-data separator 107 addresses the memory 110 opposite to that of address generator 103 which is pseudo-randomly addressed by a second pseudo-random address generator 109 in order to store the input signal 1 randomly in the memory 104 of the scrambler 50. Accordingly, the scrambled signal from the scrambler can be restored in the memory 104. A controller 106 generates control signals in order to operate the card reader and key-data separator 107 and the second pseudo-random address generator 109 as stated above, and applies read/write signal to the memory 110.

The conventional scrambler circuit 50 and unscrambler 60 circuit in FIG. 1 described above have disadvantages of being very complex and requiring very high technology. Furthermore, when the above circuits are implemented on TV, it becomes a factor for higher cost of TV units.

SUMMARY OF THE INVENTION

It is accordingly an object of the present invention to provide a circuit for scrambling input data, which has relatively fewer devices.

It is another object of the present invention to provide an address generating circuit which can pseudo-randomly address a memory in a write mode and sequentially address in a read mode, the memory being used for scrambling input data.

It is a further object of the present invention to provide a circuit which can be used for both scrambling input data and unscrambling the scrambled data.

It is still another object of the present invention to provide a circuit which can unscramble the scrambled digital TV input signal.

According to the present invention, a circuit for scrambling an input signal has a pseudo-random address generator to detect a synchronizing signal from the input signal and to generate therefrom pseudo-random address and sequential address. The inventive circuit has memories, the input signal being written thereon according to the pseudo-random address from the pseudo-random address generator in a write mode, and the input signal being read out therefrom according to the sequential address from the pseudo-random address generator in a read mode.

BRIEF DESCRIPTION OF THE DRAWINGS

For a better understanding of the invention and to show how the same may be carried into effect, reference will now be made, by way of example, to the accompanying diagrammatic drawings, in which:

FIGS. 4A to 4D are waveforms of outputs from a synchronizing signal separator 201 and a synchronization oscillator 202 in FIG. 2.

DESCRIPTION OF THE PREFERRED EMBODIMENTS

Figure 1:
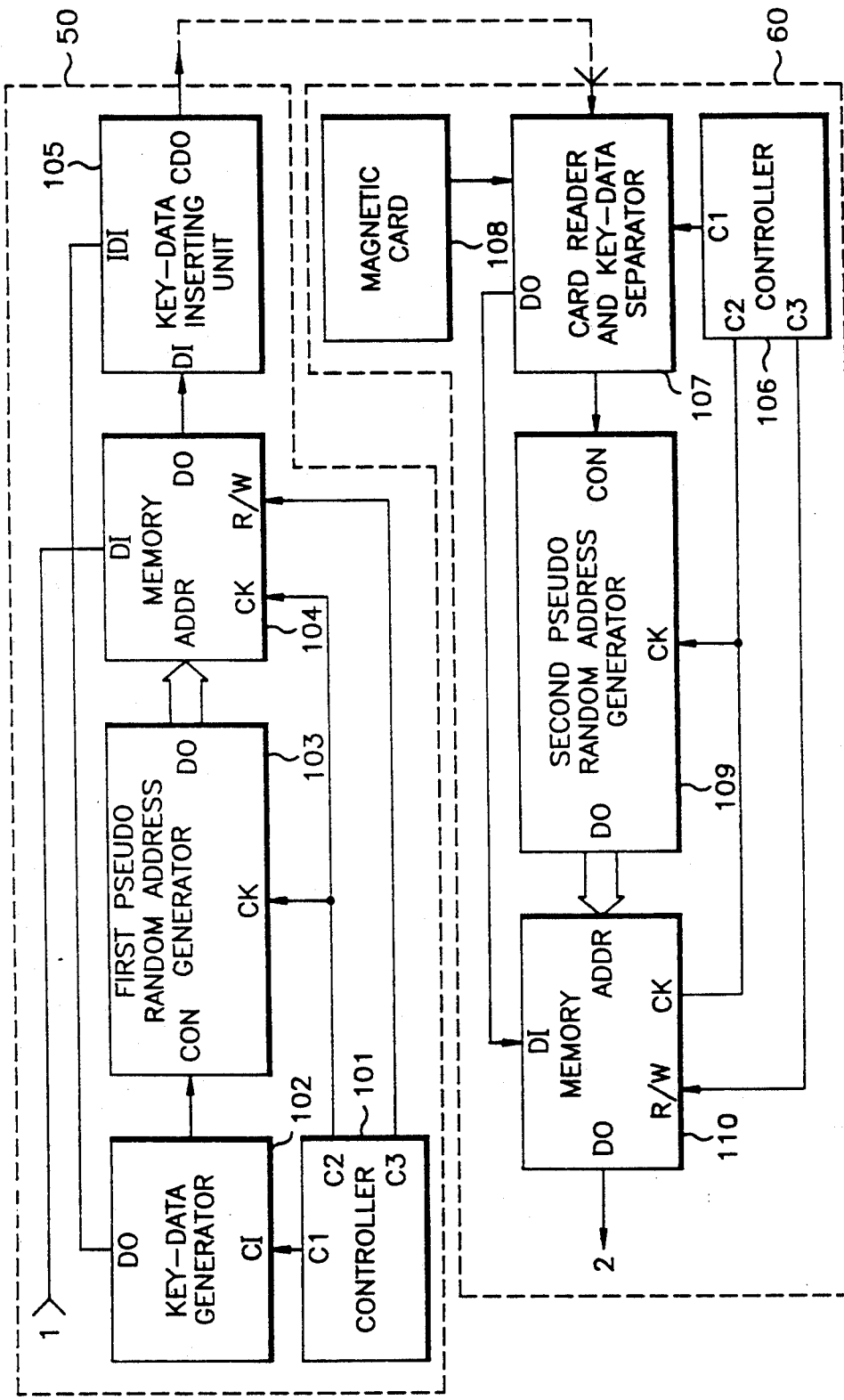
FIG. 1 is a block diagram of a conventional circuit for scrambling a signal.
Figure 2:
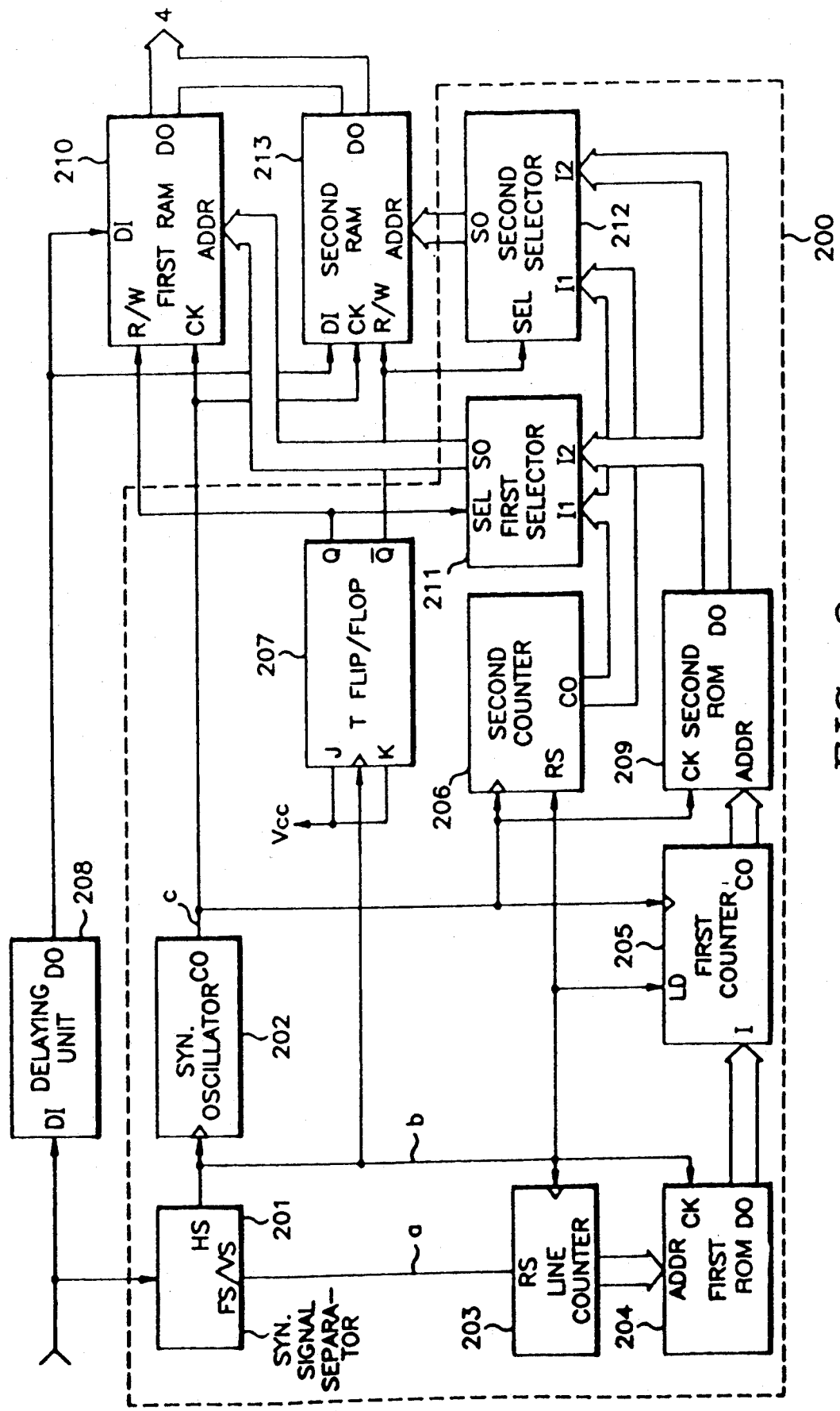
FIG. 2 is a scrambling circuit diagram according to a first embodiment of the present invention.

Referring to FIG. 2, a synchronizing signal separator 201 separates a horizontal synchronizing signal and a vertical synchronizing signal (or 1 frame signal) when a digital TV signal is applied thereto. When the vertical synchronizing signal (or frame signal) is applied to a line counter 203 as an active state, the line counter 203 is initialized and counts the horizontal synchronizing signal as clock pulse to be applied to as an address of a first ROM 204. The first read only memory (ROM) 204 supplied with the output from the line counter 203, generates internal data in synchronization with the horizontal synchronizing signal output from the synchronizing signal separator 201, when the horizontal synchronizing signal is applied thereto. A synchronization oscillator 202 supplied with the horizontal synchronizing signal output from the synchronization separator 201, generates a first pulse having a higher frequency than that of the input signal. A first counter 205 supplied with the output from the synchronization oscillator 202 as clock pulse, counts from initial value assigned by the first ROM when the horizontal synchronizing signal is applied thereto.

A second ROM 209 supplied with the counted output from the first counter 205 as the address, generates stored data when the output from the synchronization oscillator 202 is applied to a clock terminal CK thereof. A second counter 206 is initialized when the horizontal synchronizing signal is applied to a reset terminal RS thereof, and counts the output from the synchronization oscillator 202 as clock. A T Flip-Flop circuit 207 generates an inverted signal as a first selection signal and a non-inverted signal as a second selection signal, and is toggled each time when the pulse output from the synchronizing signal separator 201 is applied thereto. A first selector 211 selects either the output from the second counter 206 or the output from the second ROM 209, when the first selection signal output from the T Flip-Flop circuit 207 is applied thereto as a selection control signal. A second selector 212 selects either the output from the second counter 206 or the output from the second ROM 209, when the second selection signal from the T Flip-Flop 1 circuit 207 is applied thereto as the selection control signal.

A delaying unit 208 delays the digital TV signal during a predetermined time. A first random access memory (RAM) 210 is supplied with the output from the first selector 211 as an address, the output from the synchronization oscillator 202 as clock pulses, and the non-inverted output from the T Flip-Flop circuit 207 as a read/write signal. In this case, the stored data is read out from the first RAM 210 when the read/write signal is in an active state, and the output from the delaying unit 208 is written therein when the read/write signal is in a passive state. A second RAM 213 is supplied with the output from the second selector 212 as an address, the output from the synchronization oscillator 202 as clock pulses, and the non-inverted output from the T Flip-Flop circuit 207 as the read/write signal. In this case, the stored data is read out from the second RAM 213 when the read/write signal is in an active state, and the output from the delaying unit 208 is written therein when the read/write signal is in a passive state.

A block including the synchronizing signal separator 201, the line counter 203, the first ROM 204, the synchronization oscillator 202, the first counter 205, the second ROM 209, the second counter 206, the T Flip-Flop circuit 207, the first selector 211, and the second selector 212 will be referred to as pseudo-random address generator 200. When input signal is applied to the pseudo-random address generator 200, the synchronizing signal is separated and the above signal is used for generating the pseudo-random address and sequential address.

An embodiment in accordance with the present invention is described in the following with reference to FIG. 2, FIGS. 4A to 4D, and FIGS. 5A and 5B.

Generally, a TV signal output from a video camera is converted to a digital signal by an Analog-to-Digital converter (A/D converter) and then applied to the scrambler as an input signal as shown in FIG. 2 after passing through a regular process. In this case, since the regular process can use all the conventional TV signal process and can be changed according to process method, a detailed description is omitted. The input signal is applied to the synchronization separator 201 and the delaying unit 208. The synchronization separator 201 generates a horizontal line signal through a HS terminal, and a FS/VS signal through a FS/VS terminal and indicates the start of one field or one frame in a TV receiver unit. In this circuit, the conventional signal process techniques is used. Generally, vertical and horizontal synchronizing signals are required for generating ne frame which is composed of two fields. However, since there are other TV transmission methods which only transmitter frame signal without any distinction between fields, a FS/VS symbol is used in this embodiment. In order to avoid confusion, the FS/VS symbol will be used hereafter for representing a start point. The waveform that represents relationship between the FS/VS signal and the HS signal is shown on FIGS. 4A to 4D.

Referring to FIG. 4A to 4D, FIG. 4A represents a waveform of the FS/VS signal. FIG. 4B represents a waveform of the HS signal and FIG. 4C represents a magnified waveform of the HS signal. FIG. 4D represents a waveform of a H signal. The HS signal indicates each line of one frame between the FS/VS waveforms. The HS signal is generated as H pulses via the synchronization oscillator 202, and the relation between the HS signal and the H signal is shown in FIGS. 4C and 4D. Referring to the FIGS. 4C and 4D, a relation between the HS signal and the H signal is represented as fh=N·fhs. In this case, the frequency of the HS signal is represented as fhs; the frequency of H signal is represented as fh; and the N indicates the number of samples in one horizontal line. The above two signals must be synchronized by a PLL (Phase Locked Loop) which is not shown in FIG. 2. The H signal pulse is the sampling frequency of the A/D converter and there is the N number of samples in one horizontal line as shown on FIGS. 4C and 4D. Herein, each of these samples are called pixel (picture element).

The above described FS/VS and HS signals are generated from the synchronization signal separator 201 of the pseudo-random address generator 200 in the dotted lines, and H signal is applied to the first and second RAMs 210, 213 as a CK input.

Hereinafter, the operation of the pseudo-random address generator 200 is explained. The line counter 203 supplied with the FS/VS is initialized to 0 when the FS/VS signal changes from 1 to 0. From the moment the line counter 203 initializes to 0, the output therefrom is increased by 1 each time when the HS clock signal indicating the start point of each line is applied thereto. The output from the line counter 203 is applied to the first ROM 204 as an address and the data corresponding to the address is generated from the first ROM 204. The output from the first ROM 204 is again applied to the first counter 205 and is loaded as an initial value of the first counter, when the HS signal applied to the load terminal LD of the first counter 205 changes from 1 to 0.

The output from the first counter 205 is increased by 1 each time when the H pulse is applied thereto, thus counting the valid number of pixels in each line. There are N number of H pulses between each HS pulse which represent the total number of samples in one line including a synchronizing signal interval and a NA number of valid pixels as shown on FIG. 4A where a waveform of original signal is illustrated. When the first counter 205 counts from the initial value to NA; and then the first counter 205 is again initialized to 0 and continues to count until next HS pulse is applied thereto. For example, if the initial value is 100 and NA is 1500, the first counter 205 counts up from 100 to 1500, and then the first counter 205 is initialized to 0 to again counts up from 0 to 99. When the first counter 205 counts from its initial value and returns to the original value, the next HS pulse changes from 0 to 1 and becomes the start point of the synchronizing signal.

The second counter 206 functions similarly to the first counter 205, only differs in that the initial value is always 0. The output from the second counter 206 is applied to the input terminals I1 of the first selector 211 and the second selector 212 simultaneously. And the output from the second ROM 209 also is applied to the first and second selectors 211, 212.

Meanwhile, the HS signal is applied to the clock terminal of the T Flip-Flop circuit 207 of which J and K terminals are connected to power supply voltage Vcc. Each time when the HS signal is applied to the T Flip-Flop circuit 207, Q and $\bar{Q}$ outputs are alternately toggled. That is, if HS signal is applied to the T Flip/Flop circuit 207 when the Q and $\bar{Q}$ outputs therefrom are 1 and 0 respectively, the Q and $\bar{Q}$ outputs is toggled as 0 and 1 respectively until a next HS pulse is applied thereto. The Q and $\bar{Q}$ signals control the first and second selectors 211, 212 and the first and second RAMs 210, 213. The outputs from the second counter 206 and the second ROM 209 are applied to the first and second selectors 211, 212 of which control terminals SEL are respectively connected to the output terminals Q and $\bar{Q}$ of the T Flip-Flop circuit 207. The first and second selectors 211, 212 generate the output of the second counter 206 when the control terminal is 0, and generate the output of the second ROM when it is 1.

Therefore, if the non-inverted output terminal Q is 0 and the inverted output terminal $\bar{Q}$ is 1 at the moment when the HS pulse applied to the T Flip-Flop circuit 207, the first selector 211 selects the output from the second counter 206 to supply to the first RAM 210; and the second RAM 213 selects the output from the second ROM 209 to supply to the second RAM(213). The signals from the output terminal Q and $\bar{Q}$ of the T Flip-Flop circuit 207 are also applied to the first and second RAMs 210, 213 as a reading/writing signal R/$\overline{W}$ for controlling the above first and second RAMs 210, 213, and it becomes a read mode if the R/$\overline{W}$ input is 0 and a write mode if the input is 1. In the read mode, memory content corresponding to address assigned by the outputs from the first and second selectors 211, 212 is generated each time when the H pulse is applied. In the write mode, the digital TV signal via delaying unit 208 is written to the first and second RAMs 210, 213 according to the address assigned by the first selector 211 and the second selector 213.

As can be seen here, the delaying unit 208 delays the digital TV signal until the address is applied to the line memory. That is, one of the first and second RAM 210, 213 is in read mode and the other is in write mode between two HS pulses, and the modes are inverted by each HS pulse.

For example, if the first RAM 210 is in the write mode for one line duration, an address assigned by the data output from the second ROM 209 in the pseudo-random address generator 200 is assigned as the address of the first RAM via first selector 211 and the output from the delaying unit 208 is written in the memory region corresponding to that address for each H pulse. In this case, since the output from the first selector 211 is changed with each H pulse, the input digital signal is scrambled to be written into the first RAM 210. During this period, the second RAM 213 is in read mode and generates internal data to the output port 4 according to the address assigned by the second selector 212. Since the address selected by the second selector 212 is the output from the second counter 206 and the second counter 206 counts sequentially from 0 to NA, the data from the second RAM 213 is generated sequentially. During the next frame period, the functions of the first and second RAMs 210, 213 are reversed so that the scrambled output is generated at a constant rate, and the output from the delaying unit 208 is scrambled.

To sum it up, each time when the HS/VS pulse changes from 1 to 0, the operation stated above takes place, that is, the data of each line are combined in a random order within a frame. However, it is periodic that the random address is repeated for each FS/VS pulse in each frame and reset each time when FS/VS pulse changes from 1 to 0. However, the scrambling effect that can be obtained by randomly assigning addresses in one frame is obvious as can be seen from the above.

The scrambler as shown in FIG. 2 is used as an unscrambler, and a brief explanation is given as follows. The structure of the circuit is the same, and as noted, the unscrambler can be restore the scrambled signal to the original signal if the random address is generated in a reversed order from the scrambler. However, the first ROM 204 and the first counter 205 must be changed. Since the second ROM 209 is not changed; and the initial value of the first counter 205 is read out from the first ROM 204 to be counted up in the scrambler, the last value of the first counter 205 is loaded into the first counter 205 from the first ROM 204 and counted down in the unscrambler.

For example, when a given HS pulse is applied to the first ROM 204, the data of 100 from the first ROM 204 is generated, and the first counter 205 counts up to NA (1500) and returns to 0 and then continue to count up to 99. Therefore, if the last output from the first counter 205, that is 99, is initially loaded from the first ROM 204 and counted down, the resulting random addresses are generated exactly in reverse to those of the scrambler. Therefore, the orders of output from the first and second RAMs 210, 213 are reverse to those of output from the scrambler, and the original image signal can be restored as the result.

Figure 5A:
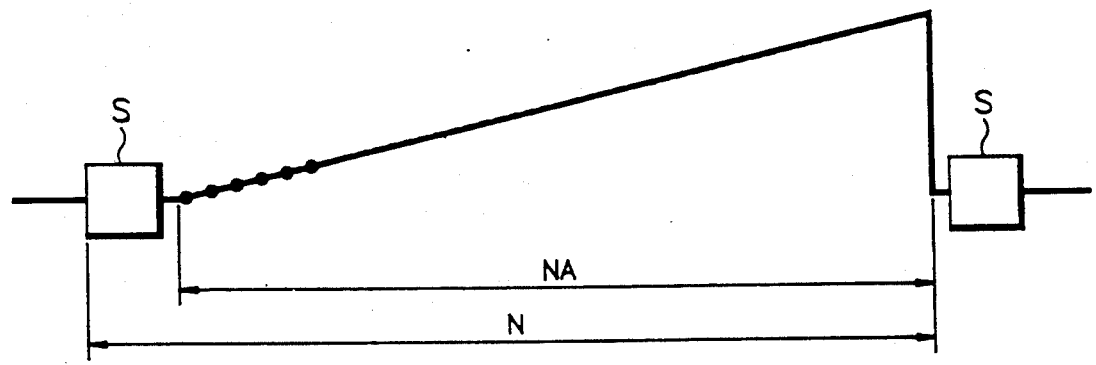
FIGS. 5A and 5B are input signal waveforms and a scrambled signal waveform from a memory in FIG. 2.
Figure 5B:
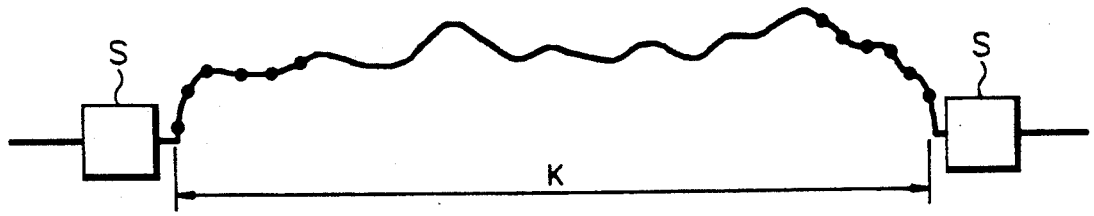

The structure of inventive random address generator 200 as described above is simple. FIGS. 5A and 5B are examples of scrambling effect using the present invention. FIG. 5A is an original waveform, and the scrambled signal output from the line memory by the random address generator is represented in FIG. 5B.

Figure 3:
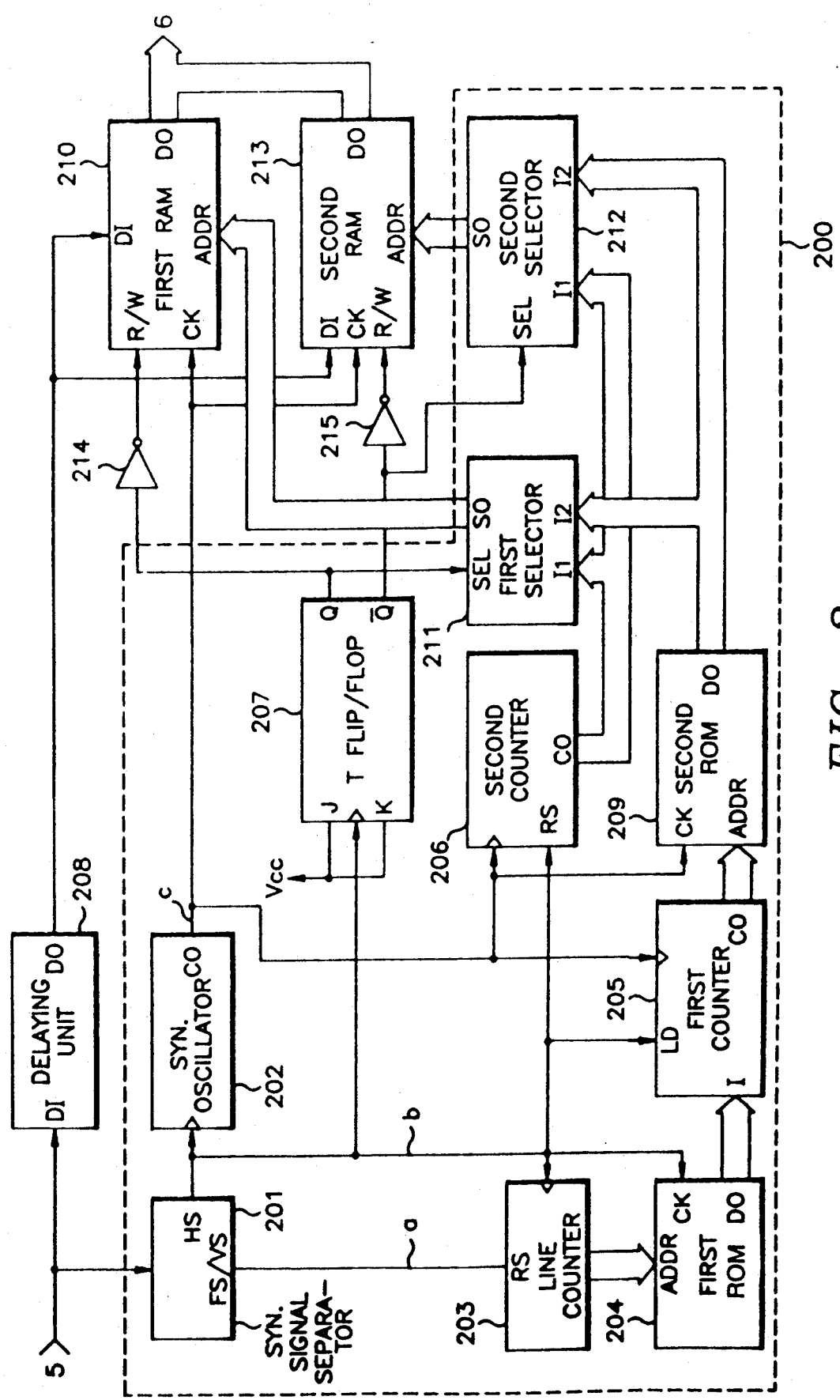
FIG. 3 is a scrambling circuit diagram of according to a second embodiment of the present invention.

Referring to FIG. 3, it is another embodiment of the present invention. The inverter 214 is coupled between the read/write signal input terminal R/W̄ of the first RAM 210 and the non-inverted output terminal Q of the T Flip-Flop circuit 207 in FIG. 2, and an inverter 215 is coupled between the read/write signal input terminal R/W̄ of the second RAM 213 and the inverted output terminal Q̄ of the T Flip-Flop circuit 207.

A brief description of the composition of the above embodiment is given in the following. The added inverters 214 and 215 in FIG. 3 function to invert the read/write signals of the first and second RAMs 210, 213. In this way, the circuit as shown in FIG. 3 can be used as the unscrambler. The scrambled signal in the scrambler of FIG. 2 can be restored by exchanging addresses in the reading and writing operation during scrambling the input signal. That is, the pseudo-random addresses used to write the input digital TV signal in the first and second RAMs 210, 213 are assigned in read mode, and the sequential addresses used to read out the data written in the first and second RAMs 210, 213 are assigned when writing the input scrambled signal. In this way, the original signal before the scrambling for transmission can be restored by unscrambling the input scrambled signal as shown in FIG. 3, when the receiving part receives the transmission signal.

As stated above, unlike conventional scrambler and unscrambler circuits that are composed of complex circuits, the present invention is composed of simple circuits, so when the circuits of the invention is adapted as a scrambling or unscrambling circuit, it can bring a considerable reduction in cost. Further, the present invention has an advantage that it can more efficiently scramble and unscramble by adding a key-data insertion circuit.

While the invention has been particularly shown and described with reference to a preferred embodiment, it will be understood by those skilled in the art that modifications in detail may be made without departing from the spirit and scope of the invention.

What is claimed is:

1. A circuit for scrambling an input video signal, comprising:
    address generating means for detecting synchronizing signals from said input video signal, and for generating therefrom a pseudo-random address and a sequential address respectively on a frame-by-frame basis; and
    means for pseudo-randomly writing said video signal onto memory means in accordance with said pseudo-random address in a write mode, and for sequentially reading said video signal from said memory means in accordance with said sequential address in a read mode.

2. A circuit as claimed in claim 1, wherein said address generating means comprises:
    synchronizing separating means for providing a horizontal synchronizing signal and a vertical synchronizing signal from said video signal;
    first counting means for counting a number of horizontal pulses of said horizontal synchronizing signal in dependence upon reception of said vertical synchronizing signal to provide an address signal;
    a first memory for storing said address signal, and for providing internal data corresponding to said address signal in dependence upon said horizontal synchronizing signal;
    synchronization oscillating means for providing a horizontal clock pulse in dependence upon reception of said horizontal synchronizing signal;
    second counting means for counting from initial value assigned to said internal data in accordance with said horizontal synchronizing signal in dependence upon reception of said horizontal clock pulse to provide internal data having a counted value;
    a second memory for storing said internal data having a counted value, and for providing said internal data in dependence upon said horizontal clock pulse in accordance with said counted value;
    third counting means or counting said horizontal clock pulse in dependence upon reception of said horizontal synchronizing signal;
    flip-flop means for generating a first selection signal representative of one of said read mode and said write mode, and a second selection signal representative of one of said read mode and said write mode in dependence upon said horizontal synchronizing signal;
    first selecting means for enabling selection between one of the outputs of said third counting means and said second memory in dependence upon said first selection signal; and
    second selecting means for enabling selection between one of the outputs of said third counting means and said second memory in dependence upon said second selection signal.

3. A circuit as claimed in claim 2, further comprising delaying means coupled between said address generating means and said memory means, for delaying said input video signal for a predetermined time.

4. A circuit as claimed in claim 3, wherein said memory means comprises:
    a third memory having a clock terminal coupled to receive said horizontal clock pulse, a read/write terminal coupled to receive said first selection signal, and an address terminal coupled to receive the output of said first selecting means representative of one of said pseudo-random address and said sequential address; and
    a fourth memory having a clock terminal coupled to receive said horizontal clock pulse, a read/write terminal coupled to receive said second selection signal, and an address terminal coupled to receive the output of said second selecting means representative of one of said pseudo-random address and said sequential address.

5. A circuit as claimed in claim 4, further comprising:
    first inverting means coupled between said third memory and said flip-flop means, for inverting said first selection signal representative of one of said read mode and said write mode to said third memory; and
    second inverting means coupled between said fourth memory and said flip-flop means, for inverting said second selection signal representative of one said read mode and said write mode to said fourth memory;
    whereby said circuit is used as an unscrambler.

6. A circuit as claimed in claim 4, wherein said circuit is used as an unscrambler when a scrambled video signal is received by changing internal data in said first memory, said first counting means as a down-counting means with an initial value, and by changing an addressing method of said third and fourth memories during said reading mode and said writing mode.

* * * * *

UNITED STATES PATENT AND TRADEMARK OFFICE
CERTIFICATE OF CORRECTION

PATENT NO. : 5,191,609

DATED : 2 March 1993

INVENTOR(S) : Heun-Heui MUN

It is certified that error appears in the above-identified patent and that said Letters Patent is hereby corrected as shown below:

On the title page:
Please change "6 Claims" to "18 Claims".

Column 3, Line 3, insert --a-- before "clock";

Column 3, Line 25, insert --a-- before "clock";

Column 4, Line 29, change "FIG. 4A to 4D" to --FIGS. 4A to 4D--;

Column 5, Line 10, insert --the-- before "original"; and

Column 6, Line 52, change "continue" to --continues--.

Please insert the following claims.

7. An apparatus for scrambling video signals for transmission at a transmitter, comprising:

means for receiving said video signals;

means for delaying said video signals for a delayed period to provide delayed video signals;

means for generating a pseudo-random address and a sequential address in dependence upon detection of synchronizing signals of said video signal; and memory means for storing said delayed video signals in a pseudo-random order in accordance with said pseudo-random address in a write mode, and for sequentially providing said delayed video signal stored in said memory means in accordance with said sequential address in a read mode to provide a scrambled signal.

UNITED STATES PATENT AND TRADEMARK OFFICE
CERTIFICATE OF CORRECTION

PATENT NO. : 5,191,609
DATED : 2 March 1993
INVENTOR(S) : Heun-Heui MUN

It is certified that error appears in the above-identified patent and that said Letters Patent is hereby corrected as shown below:

8. The apparatus for scrambling video signals as claimed in claim 7, wherein said pseudo-ransom and sequential addresses generating means comprises:

synchronizing separating means for providing a horizontal synchronizing signal and a vertical synchronizing signal from said video signals;

first counting means for counting a number of horizontal pulses of said horizontal synchronizing signal in dependence upon reception of said vertical synchronizing signal to provide a first address signal;

a first memory for storing said first address signal and for providing a first internal data corresponding to said first address signal in dependence upon said horizontal synchronizing signal;

synchronization oscillating means for providing a horizontal clock pulse in dependence upon reception of said horizontal synchronizing signal;

second counting means for counting up pixel values from an initial pixel value assigned to said first interal data in accordance with said horizontal synchronizing signal upon reception of said horizontal clock pulse to provide a second address signal;

a second memory for storing said second address signal and for providing a second internal data corresponding to said second address signal in dependence upon said horizontal clock pulse;

third counting means for counting said horizontal clock pulse in dependence upon reception of said horizontal synchronizing signal to provide a counted signal;

UNITED STATES PATENT AND TRADEMARK OFFICE
CERTIFICATE OF CORRECTION

PATENT NO. : 5,191,609
DATED : 2 March 1993
INVENTOR(S) : Heun-Heui MUN It is certified that error appears in the above-identified patent and that said Letters Patent is hereby corrected as shown below:

8. (cont.) flip-flop means for generating first and second selection signals respectively representative of ones of said read mode and said write mode in dependence upon said horizontal synchronizing signal;

first selecting means for enabling selection of one of said counted signal and said second address signal in dependence upon said first selection signal to provide a first selected address representative of one of said pseudo-random address and said sequential address; and second selecting means for enabling selection of an opposite one of said counted signal and said second address signal in dependence upon said second selection signal to provide a second selected address representative of an opposite one of said pseudo-random address and said sequential address.

9. The apparatus for scrambling video signals as claimed in claim 7, wherein said memory means comprises:

a third memory having a clock terminal coupled to receive said horizontal clock pulse, a read/write terminal coupled to receive said first selection signal representative of one of said read mode and said write mode, and an address terminal coupled to receive said first selected address representative of one of said pseudo-random address and said sequential address; and a fourth memory having a clock terminal coupled to receive said horizontal clock pulse, a read/write terminal coupled to receive said second selection signal representative of an opposite one of said read mode and said write mode,

UNITED STATES PATENT AND TRADEMARK OFFICE
CERTIFICATE OF CORRECTION

PATENT NO. : 5,191,609

DATED : 2 March 1993

INVENTOR(S) : Heun-Heui MUN

It is certified that error appears in the above-identified patent and that said Letters Patent is hereby corrected as shown below:

9. (Cont.) and an address terminal coupled to receive said second selected address representative of an opposite on of said pseudo-random address and said sequential address.

10. An apparatus for descrambling video signals at a receiver, comprising:

means for receiving scrambled video signals;

means for delaying said scrambled video signals for a delayed period to provide delayed scrambled signals;

means for generating a pseudo-random address and a sequential address in dependence upon detection of synchronizing signals of said scrambled video signals; and memory means for storing said delayed scrambled signals in a sequential order in accordance with said sequential address in a write mode, and for providing said delayed scrambled signal stored in memory means in a pseudo-random order in accordance with said pseudo-random address in a read mode to provide a descrambled signal.

11. The apparatus for descrambling video signals as claimed in claim 10, wherein said pseudo-random and sequential addresses generating means comprises:

synchronizing separating means for providing a horizontal synchronizing signal and a vertical synchronizing signal from said scrambled video signals;

UNITED STATES PATENT AND TRADEMARK OFFICE
CERTIFICATE OF CORRECTION

PATENT NO. : 5,191,609
DATED : 2 March 1993
INVENTOR(S) : Heun-Heui MUN It is certified that error appears in the above-identified patent and that said Letters Patent is hereby corrected as shown below:

11. (cont.)    first counting means for counting a number of horizontal pulses of said horizontal synchronizing signal in dependence upon reception of said vertical synchronizing signal to provide a first address signal;

a first memory for storing said first address signal and for providing a first internal data corresponding to said first address signal in dependence upon said horizontal synchronizing signal;

synchronization oscillating means for providing a horizontal clock pulse in dependence upon reception of said horizontal synchronizing signal;

second counting means for counting down pixel values from a last pixel value assigned to said first internal data in accordance with said horizontal synchronizing signal upon reception of said horizontal clock pulse to provide a second address signal;

a second memory for storing said second address signal and for providing a second internal data corresponding to said second address signal in dependence upon said horizontal clock pulse;

third counting means for counting said horizontal clock pulse in dependence upon reception of said horizontal synchronizing signal to provide a counted signal;

flip-flop means for generating first and second selection signals respectively representative of ones of said read mode and said write mode in dependence upon said horizontal synchronizing signal;

UNITED STATES PATENT AND TRADEMARK OFFICE
CERTIFICATE OF CORRECTION

PATENT NO. : 5,191,609

DATED : 2 March 1993

INVENTOR(S) : Heun-Heui MUN

It is certified that error appears in the above-identified patent and that said Letters Patent is hereby corrected as shown below:

11. (cont.) first selecting means for enabling selection of one of said counted signal and said second address signal in dependence upon said first selection signal to provide a first selected address representative of one of said pseudo-random address and said sequential address; and second selecting means for enabling selection of an opposite one of said counted signal and said second address signal in dependence upon said second selection signal to provide a second selected address representative of an opposite one of said pseudo-random address and said sequential address.

12. The apparatus for descrambling video signals as claimed in claim 10, wherein said memory means comprises:

inverter means for inverting said first and second selection signals to provide inverted first and second selection signals;

a third memory having a clock terminal coupled to receive said horizontal clock pulse, a read/write terminal coupled to receive said inverted first selection signal representative of one of said read mode and said write mode, and an address terminal coupled to receive said first selected address representative of one of said pseudo-random address and said sequential address; and a fourth memory having a clock terminal coupled to receive said horizontal clock

UNITED STATES PATENT AND TRADEMARK OFFICE
CERTIFICATE OF CORRECTION

PATENT NO. : 5,191,609
DATED : 2 March 1993
INVENTOR(S) : Heun-Heui MUN It is certified that error appears in the above-identified patent and that said Letters Patent is hereby corrected as shown below:

12. (cont.) pulse, a read/write terminal coupled to receive said inverted second selection signal representative of an opposite one of said read mode and said write mode, and an address terminal coupled to receive said second selected address representative of an opposite one of said pseudo-random address and said sequential address.

13. A method for scrambling video signals for transmission at a transmitter, comprising the steps of:
   receiving said video signals;
   delaying said video signals for a delayed period to provide delayed video signals;
   generating a pseudo-random address and a sequential address in dependence upon detection of synchronizing signals of said video signals; and
   storing said delayed video signals in a pseudo-random order onto memories in accordance with said pseudo-random address in a write mode, and for sequentially providing said delayed video signal stored in said memories in accordance with said sequential address in a read mode to provide a scrambled signal.

14. The method for scrambling video signals as claimed in claim 13, wherein said pseudo-random and sequential addresses generating step comprises the steps of:
   separating a horizontal synchronizing signal and a vertical synchronizing signal from

UNITED STATES PATENT AND TRADEMARK OFFICE
CERTIFICATE OF CORRECTION

PATENT NO. : 5,191,609
DATED : 2 March 1993
INVENTOR(S) : Heun-Heui MUN

It is certified that error appears in the above-identified patent and that said Letters Patent is hereby corrected as shown below:

14. (cont.) said video signals;

counting a number of horizontal pulses of said horizontal synchronizing signal in dependence upon reception of said vertical synchronizing signal to provide a first address signal;

storing said first address signal to provide a first internal data corresponding to said first address signal in dependence upon said horizontal synchronizing signal;

separating a horizontal clock pulse from said horizontal synchronizing signal;

counting up pixel values from an initial pixel value assigned to said first internal data in accordance with said horizontal synchronizing signal upon reception of said horizontal clock pulse to provide a second address signal;

storing said second address signal to provide a second internal data corresponding to said second address signal in dependence upon said horizontal clock pulse;

counting said horizontal clock pulse in dependence upon reception of said horizontal synchronizing signal to provide a counted signal;

generating first and second selection signals respectively representative of ones of said read mode and said write mode in dependence upon said horizontal synchronizing signal;

enabling selection of one of said counted signal and said second address signal in dependence upon said first selection signal to provide a first selected address representative of one of said pseudo-random address and said sequential address; and

UNITED STATES PATENT AND TRADEMARK OFFICE
CERTIFICATE OF CORRECTION

PATENT NO. : 5,191,609

DATED : 2 March 1993

INVENTOR(S) : Heun-Heui MUN

It is certified that error appears in the above-identified patent and that said Letters Patent is hereby corrected as shown below:

14. (cont.) enabling selection of an opposite one of said counted signal and said second address signal in dependence upon said second selection signal to provide a second selected address representative of an opposite one of said pseudo-random address and said sequential address.

15. The method for scrambling video signals as claimed in claim 13, wherein said memories comprise:

a first random-access-memory having a clock terminal coupled to receive said horizontal clock pulse, a read/write terminal coupled to receive said first selection signal representative of one of said read mode and said write mode, and an address terminal coupled to receive said first selected address representative of one of said pseudo-random address and said sequential address; and a second random-access-memory having a clock terminal coupled to receive said horizontal clock pulse, a read/write terminal coupled to receive said second selection signal representative of an opposite one of said read mode and said write mode, and an address terminal coupled to receive said second selected address representative of an opposite one of said pseudo-random address and said sequential address.

UNITED STATES PATENT AND TRADEMARK OFFICE
CERTIFICATE OF CORRECTION

| | |
|---|---|
| PATENT NO. : | 5,191,609 |
| DATED : | 2 March 1993 |
| INVENTOR(S) : | Heun-Heui MUN |

It is certified that error appears in the above-identified patent and that said Letters Patent is hereby corrected as shown below:

16. A method for descrambling video signals at a receiver, comprising:

receiving scrambled video signals;

delaying said scrambled video signals for a delayed period to provide delayed scrambled signals;

generating a pseudo-random address and a sequential address in dependence upon detection of synchronizing signals of said scrambled video signals; and storing said delayed scrambled signals in a sequential order onto memories in accordance with said sequential address in a write mode, and for providing said delayed scrambled signal stored in said memories in a pseudo-random order in accordance with said pseudo-random address in a read mode to provide a descrambled signal.

17. The method for descrambling video signals as claimed in claim 16, wherein said pseudo-random and sequential addresses generating step comprises the steps of:

separating a horizontal synchronizing signal and a vertical synchronizing signal from said scrambled video signals;

counting a number of horizontal pulses of said horizontal synchronizing signal in dependence upon reception of said vertical synchronizing signal to provide a first address signal;

storing said first address signal to provide a first internal data corresponding to said

UNITED STATES PATENT AND TRADEMARK OFFICE
CERTIFICATE OF CORRECTION

PATENT NO. : 5,191,609

DATED : 2 March 1993

INVENTOR(S) : Heun-Heui MUN

It is certified that error appears in the above-identified patent and that said Letters Patent is hereby corrected as shown below:

17. (cont.) first address signal in dependence upon said horizontal synchronizing signal;

providing a horizontal clock pulse in dependence upon reception of said horizontal synchronizing signal;

counting down pixel values from a last pixel value assigned to said first internal data in accordance with said horizontal synchronizing signal upon reception of said horizontal clock pulse to provide a second address signal;

storing said second address signal to provide a second internal data corresponding to said second address signal in dependence upon said horizontal clock pulse;

counting said horizontal clock pulse in dependence upon reception of said horizontal synchronizing signal to provide a counted signal;

generating first and second selection signals respectively representative of ones of said read mode and said write mode in dependence upon said horizontal synchronizing signal;

enabling selection of one of said counted signal and said second address signal in dependence upon said first selection signal to provide a first selected address representative of one of said pseudo-random address and said sequential address;

enabling selection of an opposite one of said counted signal and said second address signal in dependence upon said second selection signal to provide a second selected address representative of an opposite one of said pseudo-random address and said sequential address;

UNITED STATES PATENT AND TRADEMARK OFFICE
CERTIFICATE OF CORRECTION

PATENT NO. : 5,191,609

DATED : 2 March 1993

INVENTOR(S) : Heun-Heui MUN

It is certified that error appears in the above-identified patent and that said Letters Patent is hereby corrected as shown below:

17. (cont.)    and inverting said first and second selection signals to provide inverted first and second selection signals.

UNITED STATES PATENT AND TRADEMARK OFFICE
CERTIFICATE OF CORRECTION

PATENT NO. : 5,191,609

DATED : 2 March 1993

INVENTOR(S) : Heun-Heui MUN

It is certified that error appears in the above-indentified patent and that said Letters Patent is hereby corrected as shown below:

18. The method for descrambling video signals as claimed in claim 16, wherein said memories comprise:

a first random-access-memory having a clock terminal coupled to receive said horizontal clock pulse, a read/write terminal coupled to receive said inverted first selection signal representative of one of said read mode and said write mode, and an address terminal coupled to receive said first selected address representative of one of said pseudo-random address and said sequential address; and a second random-access-memory having a clock terminal coupled to receive said horizontal clock pulse, a read/write terminal coupled to receive said inverted second selection signal representative of an opposite one of said read mode and said write mode, and an address terminal coupled to receive the output of said second selected address representative of an opposite one of said pseudo-random address and said sequential address.

Signed and Sealed this

Twenty-ninth Day of March, 1994

Attest:

BRUCE LEHMAN

Attesting Officer    Commissioner of Patents and Trademarks